(12) United States Patent (10) Patent No.: US 11,040,399 B2
Jarvis (45) Date of Patent: Jun. 22, 2021

(54) METHOD FOR MANUFACTURING A METAL BASED COMPONENT HAVING A CAVITY, AND A METAL BASED COMPONENT HAVING A CAVITY

(71) Applicant: HIPtec AS, Oslo (NO)

(72) Inventor: David Jarvis, Oslo (NO)

(73) Assignee: HIPTEC AS, Olso (NO)

( * ) Notice: Subject to any disclaimer, the term of this patent is extended or adjusted under 35 U.S.C. 154(b) by 0 days.

(21) Appl. No.: 16/771,555

(22) PCT Filed: Dec. 21, 2018

(86) PCT No.: PCT/EP2018/086718
§ 371 (c)(1),
(2) Date: Jun. 10, 2020

(87) PCT Pub. No.: WO2019/122389
PCT Pub. Date: Jun. 27, 2019

(65) Prior Publication Data
US 2020/0376562 A1 Dec. 3, 2020

(30) Foreign Application Priority Data
Dec. 21, 2017 (EP) .................................... 17209451

(51) Int. Cl.
*B22F 5/10* (2006.01)
*B22F 3/15* (2006.01)
(Continued)

(52) U.S. Cl.
CPC ................ *B22F 5/106* (2013.01); *B22F 3/14* (2013.01); *B22F 3/15* (2013.01); *B22F 5/10* (2013.01);
(Continued)

(58) Field of Classification Search
CPC .................................. B22F 5/106; B22F 3/15
(Continued)

(56) References Cited

U.S. PATENT DOCUMENTS 5,758,848 A 6/1998 Beule
8,280,569 B2 10/2012 Kumar et al.
(Continued)

FOREIGN PATENT DOCUMENTS

CA 1171666 A 7/1984
CH 577007 A5 6/1976
(Continued)

OTHER PUBLICATIONS

European search report for EP Application No. 19210597.1 which is the parent application to the instant application, dated Jun. 5, 2020, 14 pages.
International Search Report and Written Opinion for PCT Application No. PCT/EP2018/086718 filed Dec. 21, 2018, dated May 10, 2019, 17 pages.
(Continued)

*Primary Examiner* — Weiping Zhu
(74) *Attorney, Agent, or Firm* — Harness, Dickey & Pierce, P.L.C.; Anthony G. Fussner

(57) ABSTRACT

The inventive concept relates to a method for manufacturing a metal based component (100, 200) having a cavity (103, 203). The method comprises the steps of: providing a plurality of individual segments (110, 210) corresponding to different portions of the metal based component; arranging the plurality of segments in a stack (120, 220) in such a way that the shape of the stack corresponds to the shape of the metal based component, and that a void (130, 230) is formed in the stack, wherein the shape of at least a portion of the void corresponds to the shape of the cavity; filling at least the first 10 portion of the void with an incompressible filler (140, 240); removing gas from the stack; subjecting the (Continued)

stack to a hot pressing process to form the metal based component comprising the cavity; removing at least a part of the incompressible filler from the metal based component.

12 Claims, 7 Drawing Sheets

(51) Int. Cl.
*C23C 24/08* (2006.01)
*B33Y 80/00* (2015.01)
*B22F 3/14* (2006.01)
*F16L 9/22* (2006.01)
*B33Y 10/00* (2015.01)
*B22F 10/20* (2021.01)

(52) U.S. Cl.
CPC ............ *B33Y 80/00* (2014.12); *C23C 24/082* (2013.01); *F16L 9/22* (2013.01); *B22F 10/20* (2021.01); *B22F 2005/103* (2013.01); *B22F 2302/406* (2013.01); *B33Y 10/00* (2014.12)

(58) Field of Classification Search
USPC ........................................................ 138/155
See application file for complete search history.

(56) References Cited

U.S. PATENT DOCUMENTS

| | | |
|---|---|---|
| 10,151,592 B2 | 12/2018 | Averbuch et al. |
| 2008/0115358 A1 | 5/2008 | Rice et al. |
| 2009/0226338 A1 | 9/2009 | Troitski et al. |
| 2014/0219854 A1 | 8/2014 | Matsen et al. |
| 2016/0298218 A1* | 10/2016 | Kilmer .................... C22C 21/08 |

FOREIGN PATENT DOCUMENTS

| | | |
|---|---|---|
| EP | 2998049 A1 | 3/2016 |
| EP | 3492306 A1 | 6/2019 |
| GB | 2335155 A | 9/1999 |
| SU | 799960 A1 | 1/1981 |
| WO | WO-2008027905 A2 | 3/2008 |
| WO | WO-2016149196 | 9/2016 |
| WO | WO-2018020928 A1 | 2/2018 |

OTHER PUBLICATIONS

International Preliminary Report and Written Opinion for PCT/EP2018/086718 filed Dec. 12, 2018, which is the parent application to the instant application; dated Feb. 25, 2020, 24 pages.

* cited by examiner

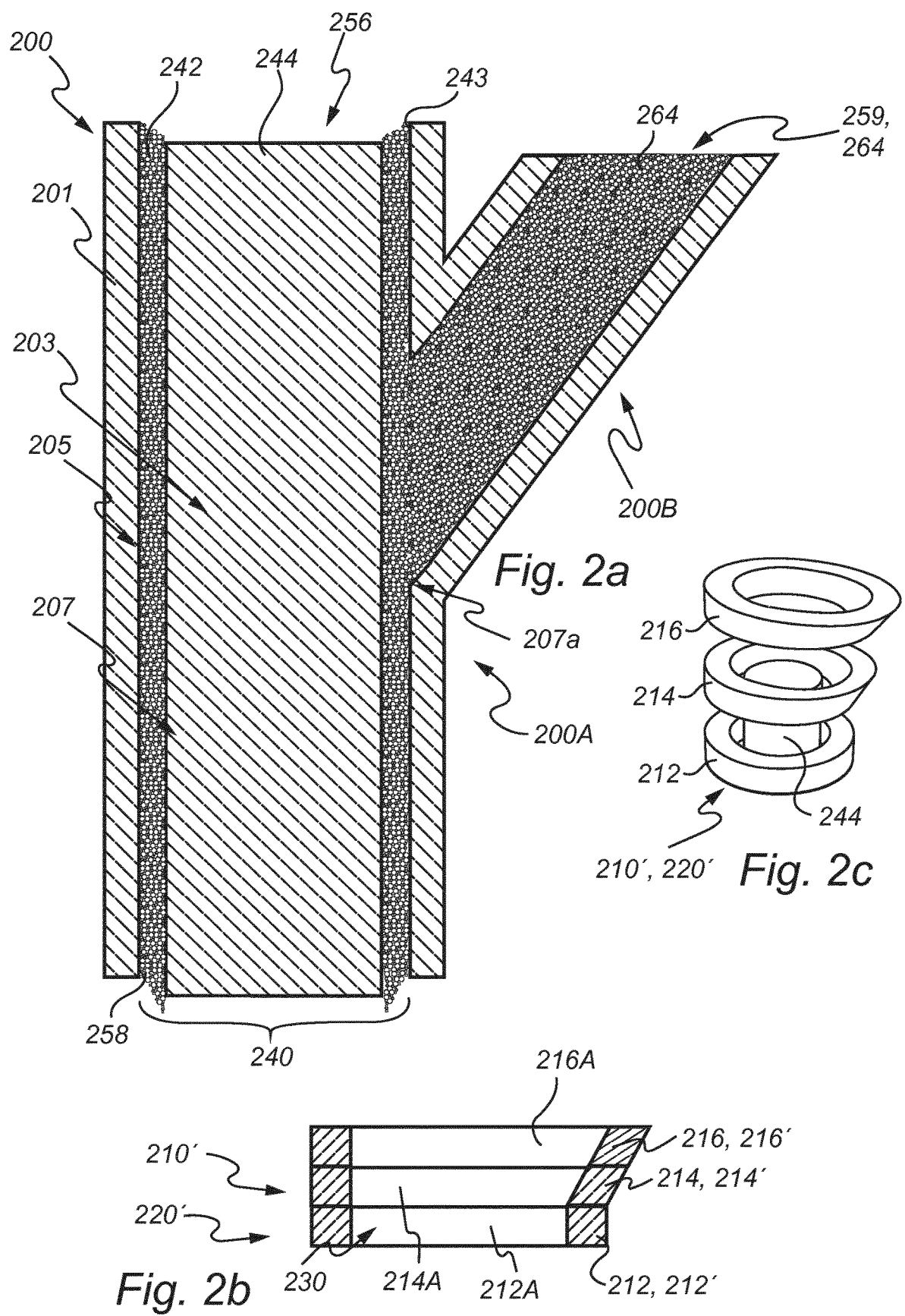

METHOD FOR MANUFACTURING A METAL BASED COMPONENT HAVING A CAVITY, AND A METAL BASED COMPONENT HAVING A CAVITY

This patent application is a U.S. national stage filing under 35 U.S.C. § 371 of PCT International Application No. PCT/EP2018/086718 filed Dec. 21, 2018 (published as WO2019/122389 on Jun. 27, 2019), which claims priority to and the benefit of European Application No. 17209451.8 filed Dec. 21, 2017. The entire contents of these applications are incorporated herein by reference.

TECHNICAL FIELD OF THE INVENTION

The present invention relates to a method for manufacturing a metal based component having a cavity, to a metal based component having a cavity, and to the use of an incompressible filler when manufacturing a metal based component having a cavity.

BACKGROUND OF THE INVENTION

Metal based components can be used in various applications and the size and/or composition of such components typically vary with the application. The cost and time for producing a metal based component is often of great interest.

One type of metal based components comprises a cavity, such as e.g. an internally extending cavity or a flow channel for transporting fluids. Examples of such metal based components are tubes, ducts, manifolds, reducers, expanders, nozzles, reservoirs, fluid diodes, valves or the like.

Current manufacturing technologies of metal based components having a cavity, such as a flow channel, are typically based on e.g. machining-from-solid such as e.g. milling of a forged billet to form the outer shape of the metal based component, followed by e.g. hole drilling and/or electro-discharge machining of internal portions to form the cavity. This may be very costly, especially for very hard materials. Furthermore, the drilling or machining of internal portions to form the cavity puts limits on the shape and geometry of the cavity, as e.g. drilling around corners or in U-bends is very difficult, or even impossible.

Another manufacturing technology for making a metal based component having a cavity is additive manufacturing where the metal based component Is 3D-printed to include the cavity. When using additive manufacturing, the cavity will be surrounded by internal wall portions having a rough surface finish because of the inherent layering of materials. Moreover, the starting feedstock material is expensive and producing metal based components in the range of 100 kg-1000 kg is not practical or cost-effective.

For other manufacturing techniques, such as e.g. welding manufacturing technology, problems and impairments may be introduced into the metal based components due to the nature of welding, e.g. in the form of cracks, high porosity, distortion and residual stresses, etc. Thus, the formed frame structure may be fragile and/or in need of costly non-destructive testing of the frame structure.

Therefore, there is a need to improve the current state of the art in order to overcome the above mentioned problem as well as other problems.

SUMMARY OF THE INVENTION

An object of the present inventive concept is to provide an improved method for manufacturing a metal based component having a cavity, which at least partly alleviates the above mentioned drawbacks. This and other objects, which will become apparent in the following, are accomplished by a method for manufacturing a metal based component, and a metal based component, as defined in the accompanying claims. The objects are further accomplished by the use of an incompressible filler, during the manufacturing a metal based component.

The present inventive concept is based on the insight that a metal based component having a cavity can be manufactured in an effective manner by arranging a plurality of segments in a stack such that a void is formed inside said stack, wherein at least a portion of the void is filled with an incompressible filler such that the size and dimensions of said portion of the void will be maintained during a hot pressing process of said stack in which said segments bond metallurgically to each other to form said metal based component. Hereby, the portion of the void holding said incompressible filler will form the cavity of the metal based component in a desired manner. After said hot pressing process, the incompressible filler is removed from the cavity. By the present inventive concept, metal based components having a relatively complex cavity, such as a cavity having an internally extending geometry with a bent, e.g. a flow channel having a plurality of bends, can be made in a straightforward way, and complex drilling, boring, gundrilling or machining can be avoided or at least reduced when manufacturing the metal based component with said cavity. Moreover, by the present inventive concept, metal based components having cavities which are practically impossible to create by drilling or machining, can be manufactured.

Stated differently, by arranging the plurality of segments in relation to each other such that a void is formed in a predetermined shape, or that at least a portion of the void is formed in said predetermined shape, and filling said predetermined shaped void with an incompressible filler, the predetermined shape of the void will be maintained during a hot pressing process in which the segments bond metallurgically to each other to form said metal based component. Thus the predetermined shape of said void, or at least said portion of the void, will correspond to the predetermined shape of the cavity of the metal based component. Thus, a metal based component having a cavity can be manufacture in an effective manner.

According to a first aspect of the present inventive concept, a method for manufacturing a metal based component having a cavity is provided. The method comprises the steps of:

providing a plurality of individual segments corresponding to different portions of the metal based component;

arranging said plurality of segments in a stack in such a way that the shape of said stack corresponds to the shape of the metal based component, and such that a void is formed in said stack, wherein the shape of at least a portion of said void corresponds to the shape of said cavity;

filling at least said portion of the void with an incompressible filler;

removing gas from said stack;

subjecting said stack to a hot pressing process for a predetermined time at a predetermined pressure and a predetermined temperature such that said segments bond metallurgically to each other to form said metal based component comprising said cavity;

removing at least a part of said incompressible filler from said metal based component.

Hereby, a metal based component having a cavity can be manufactured in an effective manner. By manufacturing the metal based component using segments, wherein the segments are arranged such that a void is formed, complex geometries of the void can relatively easily be created in the stack, as the void to at least some extent is segmented, or as the formation of the void is based on the arrangement of the segments. Thus, the segments contribute in the formation of the void, and thus the complexity of the void can be distributed among the segments and their arrangement in the stack. Hereby, complex geometries of the void, or said portion of the void, can be achieved, and as said portion of the void is filled with an incompressible filler, the same complex geometry can be made for the cavity of the metal based component.

Herein, an "individual segment" refers to a discrete object, preferably a solid discrete object.

Herein, the term "arranging said plurality of segments" refers to a step of arranging the segments such that each segment is in physical contact with at least one other segment. The step of arranging is performed such that no metallurgical bonds will be formed between segments in contact with each other. The step of arranging is preferably performed at ambient temperature and pressure. Preferably, the temperature and pressure is measured at an interface between the at least two segments. Engineering materials does not form metallurgical bonds under such conditions.

The plurality of segments may comprise at least two segments, such as three segments, preferably four or more segments.

According to at least one example embodiment, the step of arranging said plurality of segments in a stack comprises arranging at least some of said segments such that said void is formed in said stack.

It should be noted that when stating that the shape of at least a portion of said void corresponds to the shape of said cavity, typically the shape and dimensions, such as e.g. a predetermined shape and predetermined dimensions of at least said portion of said void, corresponds to, or are the same as, the shape and dimensions, such as e.g. the same predetermined shape and predetermined dimensions, of said cavity of said metal based component. The void may be described as being arranged internally of said stack, and the cavity may be described as an internal cavity of the metal based component. The void, such as at least said portion of the void, may extend internally of said stack, and have an internally extending geometry, and thus the cavity may extend internally of said metal based component, and have an internally extending geometry According to at least one example embodiment, the shape and dimensions of said portion of the void is predetermined, and may e.g. be delimited from any other portion of the void which will not form part of the cavity. Hence, said predetermined shaped and dimensioned portion of the void holding the incompressible filler during the hot pressing process, will in a predetermined way form the said cavity into the same predetermined shape.

According to at least one example embodiment, the shape and dimensions of said portion of the void, or said predetermined portion of said void, are maintained during the hot pressing process to form said cavity. at According to at least one example embodiment, the method comprises the step of forming said void, or said portion of said void, to have at least one bend, or to have at least two bends, or to have at least three bends.

Hereby, a method for creating a cavity of the metal based component which is difficult to form by e.g. drilling, is provided. According to at least one example embodiment, the void, and hence the cavity, may be U-shaped.

According to at least one example embodiment, the cavity is a flow channel, and the metal based component is a component for transferring a fluid in said flow channel. According to at least one example embodiment, the cavity is to at least 70%, or to at least 80%, or to at least 90% covered or defined by internal wall portions of the metal based component.

According to at least one example embodiment, the geometry of the void, or the shape of the void, or said portion of the void, is complex, e.g. such that it comprises at least two bends. Thus, said cavity will be complex and may e.g. comprise said at least two bends.

According to at least one example embodiment, the void comprises a portion with a relatively small cross sectional area, and a portion with a relatively large cross sectional area. According to at least one example embodiment, said portion with a relatively large cross sectional area is interposed between two portions having a relatively small cross sectional area. Such geometrical configurations are typically difficult to achieve with standard manufacturing technologies.

It should be understood that the terms like "at least one of the plurality of segments" is a short version of at least one segment in the plurality of segments. Moreover, throughout the text, a segment, or segments, may be referred to without specifying that the segment(s) is a part of the plurality of segments, however such segment(s) should be interpreted as belonging to the plurality segments.

It should further be noted that when stating that the segments correspond to different portions of the metal based component, typically, the shape and dimensions of each segment corresponds to, or are the same as, the shape and dimensions of a corresponding portion of the metal based component. According to at least one example embodiment, each segment, or the shape and dimensions of each segment, in said plurality of segments corresponds to, or as the same as, a certain portion, or the shape and dimensions of a certain portion, of the metal based component.

According to at least one example embodiment, the method comprises the step of forming the void in said stack, or forming at least said portion of the void in said stack, into a predetermined shape, wherein the predetermined shape corresponds to, or are the same as, the shape of the cavity of the metal based component. This may e.g. be carried out during the step of arranging at least some of said segments such that a void is formed, or in a separate step of delimiting said portion of the void. Hence, the predetermined shape of the void, or of at least said portion of the void, will be maintained during the hot pressing process in which the segments bond metallurgically to each other to form said metal based component.

According to at least one example embodiment, said portion of said void is the only portion of said void. Thus, for such embodiments, the void, or the shape and dimensions of said void, corresponds to, or are the same as, the cavity, or the shape and dimensions of said cavity. Said shape is typically a predetermined shape.

According to at least one example embodiment, at least a portion of the outer boundary of at least one segment is formed such that it corresponds to, or are the same as, the shape of at least a part of the void. In other words, at least a portion of the outer boundary of at least one segment may form an internal wall portion which at least partly defines said void. Such portion of the outer boundary is typically arranged internally of said stack.

According to at least one example embodiment, at least one segment comprises a hole, such as e.g. a through hole, wherein said hole or said through hole forms at least a part of said void. According to at least one example embodiment, at least one segment is arranged such that a solid material of said segments surrounds a space, wherein the space forms at least a part of said void. At least some of the segments may comprise a through hole.

According to at least one example embodiment, several segments comprise a respective through hole, wherein said step of arranging said plurality of segments in a stack, such that a void is formed in said stack, comprises arranging said segments comprising a through hole in such a way that said through holes align, and thus form said void, or at least a part of said void.

According to at least one example embodiment, the void may be at least partly formed by an intermediate space between different segments, i.e. by arranging segments such that an intermediate space is formed between at least some of the segments, or the void may be at least partly formed by aligned holes or through holes comprised in different segments, i.e. by arranging segments comprising a hole or a through hole such that the aligned holes or through holes form at least a part of said void. In both of the two above cases, the void is typically defined by internal wall portions of said stack, such as wall portions of said segments arranged internally of said stack.

According to at least one example embodiment, said incompressible filler comprising at least diamond powder, and said step of removing at least a part of said incompressible filler comprises removing at least a part of said diamond powder from said metal based component.

Hereby, a powder which is incompressible and which is substantially inert, at least during said hot pressing process for said predetermined time at said predetermined pressure and said predetermined temperature, is provided. Moreover, as diamond powder has flow properties, i.e. it may be poured into said void, and it may be poured out from said cavity, the handling of the incompressible filler is improved. Thus, according to at least one example embodiment, said diamond powder is configured to have flow properties.

According to at least one example embodiment, the diamond powder comprises at least 50%, or at least 60%, or at least 70%, or at least 80%, or at least 90%, such as e.g. at least 95%, or at least 99%, such as e.g. 100% of diamond particles, said percentage being weight based.

According to at least one example embodiment, said diamond powder comprises at least one of the following materials: zirconia, silicon carbide, tungsten carbide, boron carbide, calcium hexaboride. Such material may be present in the diamond powder such that it corresponds to up to 30%, e.g. between 1% and 25%, or between 5% and 15%, of the weight of the total diamond powder.

Even though the void fraction of diamond powder typically is around 30%, the material characteristics of the diamonds, or the diamond powder characteristics, provide for a more or less incompressible property of the diamond powder, as the crystal facets of different diamond particles in the diamond powder are in contact with each other, and thus withstand compression without fracture when being subject to an external load, such as an external load stemming from the hot pressing process, and more specifically, said predetermined pressure during said predetermined time of said hot pressing process.

It should be understood that the diamond powder is inert in the context of not reacting with itself, i.e. a first diamond particle in the diamond powder will not bond to another diamond particle in the diamond powder during the hot pressing process. However, at least some of the diamond particles which are adjacent a metal surface within the void, such as e.g. a surface of a segment, may react and form a metal carbide layer, such as e.g. Iron Carbide, $Fe_3C$, Titanium Carbide, TiC or Tungsten Carbide, WC, depending on the material of the metal surface. Thus, according to at least one example embodiment, the method comprises the step of coating, or forming, internal wall portions, or an internal surface, of said cavity with a metal carbide layer. Hence, said internal wall portions or said internal surface of said metal based component, which internal wall portions or internal surface defines said cavity, is at least partly covered, or is coated, with a metal carbide layer. Such metal carbide layer is typically hard, and thus the internal wall portions of said cavity are more wear-resistant.

According to at least one example embodiment, at least a part, such as e.g. the majority of, or all of, or substantially all of said incompressible filler is removed from said metal based component. For example, the incompressible filler is (at least partly) removed from the cavity of the metal based component. According to at least one example embodiment, at least a part, such as e.g. the majority of, or all of, or substantially all of said diamond powder is removed from said metal based component. For example, the diamond powder is (at least partly) removed from the cavity of the metal based component.

According to at least one example embodiment, an average powder size of said diamond powder is between 1 micron and 1000 microns, such as between 5 microns and 500 microns, preferably between 50 microns and 500 microns or between 5 microns to 100 microns. Preferably, the average powder size of said diamond powder is between 25 and 37 microns.

Such average powder size is suitable for the use of the diamond powder as incompressible filler. Larger powder sizes than 1000 microns are typically impractical and/or too expensive to manufacture, and a smaller powder size than 1 micron are typically impractical or even hazardous to use. Moreover, for powder sizes of between 1 micron and 1000 microns, the diamond powder has flow properties, as described above.

The diamond particles of said diamond powder may vary greatly in size. For example, and according to at least one example embodiment, the diamond powder may comprise at least two different sets with different average powder sizes, as so called bimodal mixture. For example, a first set of the diamond powder may comprise diamond particles having a relatively small average powder size, such as e.g. between 1 micron and 400 microns, and a second set of the diamond powder may comprise diamond particles having a relatively larger average powder size, such as e.g. between 600 microns and 1000 micron. Hereby, the void fraction of the diamond powder may be reduced, as the relatively smaller diamond particles (i.e. the set of finer diamond powder) will fill the gaps between the relatively larger diamond particles (i.e. the coarser diamond powder). The average powder size between the first set and the second set may e.g. vary by at least a factor of 2. According to at least one example embodiment, further sets with different average powder size may be present in the diamond powder to provide a so called multimodal mixture.

It should be noted that the term "powder size" may be referred to as "particle size", i.e. said average powder size of said diamond powder may be referred to as an average particle size of said diamond powder.

The powder size may be determined by means of sieving and preferably into tight fractions with respect to size, e.g. by using two consecutive sieves. Such means are known to a person skilled in the art and are commonly referred to as "mesh".

In one example, the powder sizes has been determined by sieving through two consecutive US mesh sizes 400 and 500 (400/500 US), which yields powder having an average powder size in the range of 25 to 37 microns.

The size of the particles may also be verified using optical methods in a microscope.

According to at least one example embodiment, the diamonds in the diamond powder is artificial, or synthetic diamonds. According to at least one example embodiment, the diamonds in the diamond powder are so called real, or natural diamonds, i.e. they are formed at high temperature and pressure at depths of e.g. 140 to 190 km in the Earth's mantle.

According to at least one example alternative embodiment, the diamond powder is replaced by another incompressible and inert powder, which inert powder is incompressible and inert in relation to the hot pressing process. Such inert powder will typically have the same characteristics as described above for the diamond powder, at least that the facets of different particles in the inert powder are in contact with each other, and thus withstand compression when being subject to an external load, such as an external load stemming from the hot pressing process, and more specifically, said predetermined pressure during said predetermined time of said hot pressing process.

According to at least one example embodiment, said incompressible filler is said diamond powder, i.e. a powder comprising diamonds. In other words, according to such embodiments, the incompressible filler consists solely of diamond powder.

According to at least one example embodiment, said incompressible filler further comprises a solid metal insert, and wherein said step of filling at least said portion of the void with an incompressible filler comprises embedding said solid metal insert in said diamond powder.

Hereby, the amount of diamond powder may be reduced, and said portion of the void may be filled in a more economic and effective manner. Moreover, by embedding the solid metal insert in said diamond powder, bonding of the solid metal insert with another internal metal surface within said stack is avoided. The layer of diamond powder between any internal metal surface of the stack and said solid metal insert may e.g. be at least 0.5 mm, such as e.g. at least 1 mm. It should be noted that the solid metal insert is typically chosen such that it withstands compression during the hot pressing process for said predetermined time at said predetermined pressure and said predetermined temperature. Moreover, the solid metal insert is typically chosen such that it does not melt during the hot pressing process, i.e. that it has a higher melting point than the predetermined temperature used during the hot pressing process.

According to at least one example embodiment, said solid metal insert comprises at least 50% metal. The solid metal insert may be referred to as a solid metal block, or a solid metal element. The solid metal insert is typically at least 10 times as a larger as the average powder size of said diamond powder.

According to at least one example embodiment, said incompressible filler comprises a plurality of solid metal inserts, such as e.g. ball bearings, and wherein said step of filling at least said portion of the void with an incompressible filler comprises embedding said plurality of solid metal inserts in said diamond powder.

According to at least one example alternative embodiment, said incompressible filler comprises a solid insert, and wherein said step of filling at least said portion of the void with an incompressible filler comprises embedding said solid insert in said diamond powder.

Hence, for such embodiments the solid insert needs not to be made out of metal, but is instead made out of another incompressible material, such as e.g. a ceramic material. The solid insert is typically at least 10 times as a larger as the average powder size of said diamond powder.

Thus, according to at least one example embodiment, the incompressible filler consists of diamond powder, or comprises a diamond powder and at least one solid metal insert, or comprises diamond powder and at least one solid insert. Thus, said step of filling at least said portion of the void with an incompressible filler, comprises:

filling said portion with diamond powder, or
filling said portion with diamond powder and said solid metal insert, or with diamond powder and said solid insert, such that said solid metal insert or said solid insert is embedded in said diamond powder.

According to at least one example embodiment, said portion of the void is filled, or almost filled, such as e.g. filled to at least 70% or at least 80% or at least 90% or at least 95% or at least 99%, or filled to a 100% with said incompressible filler. In other words, the void fraction in said portion of the void, subsequently to filling said portion of the void with said incompressible filler, may be e.g. at most 30%, or at most 20%, or at most 10%, or at most 5% or at most 1%, or 0.

According to at least one example embodiment, the method comprises the step of arranging a metal foil inside of said void such that said metal foil prevents contact between said segments and said incompressible filler.

Hereby, handling of the incompressible filler may be improved, and for example, for embodiments in which the incompressible filler comprises a powder, such as the diamond powder, the powder will be hindered from undesirably entering any gaps or spaces between segments within said stack. After subjecting said stack to said hot pressing process, the metal foil will typically be comprised in the metal based component as an internal wall of said cavity.

According to at least one example embodiment, said portion of the void is a first portion of the void, and the method comprises the step of arranging a metal tube inside of said void such that said void is divided into at least two portions, said first portion inside of said metal tube, and a second portion outside of said metal tube, and wherein the material of said metal tube is the same or different compared to the material of at least one segment.

Hereby, handling of the incompressible filler may be improved, and for example, for embodiments in which the incompressible filler comprises a powder, such as the diamond powder, the powder will be hindered from undesirably entering any gaps or spaces between segments within said stack. Moreover, by providing a metal tube which comprises said first portion of the void, the shape and dimensions of the cavity of the metal based component may relatively easy be defined, as said metal tube may be formed in a desired manner such that the inside of said metal tube corresponds to, or are the same as, the shape and dimensions of said cavity. The metal tube is typically pre-shaped into its desired shape, and is adapted to fit inside said void, prior to arranging said metal tube inside said void. Moreover, by choosing the material of said metal tube to be the same or different compared to the material of at least one segment, the material properties of the metal tube, and hence the internal wall portions of the cavity, can be adapted based on the needs. For example, the material of the metal tube can be chosen to be stronger, harder and/or more wear resistant compared to the material of at least one segment, or the material of said plurality of segments.

According to at least one example embodiment, the cross section of said metal tube is round, e.g. circular. According to at least one example embodiment, the cross section of said metal tube is polygonal, such as e.g. square-shaped, or rectangularly shaped.

According to at least one example embodiment, the method comprises the step of forming said metal tube to have at least one bend, or at least two bends, or at least three bends. Hereby, means for forming the cavity, possibly into a relatively complex shape, by forming the first portion of the void is provided.

According to at least one example embodiment, the metal tube is solid, or rigid. According to at least one example embodiment, the metal tube is flexible, such as e.g. a flexible braided hose.

According to at least one example embodiment, the step of filling at least said portion of the void with an incompressible filler is carried out subsequently to said step of arranging a metal tube inside of said void. Hence, the step of filling at least said portion of the void will correspond to the step of filling at least said first portion of the void with an incompressible filler. Thus, the incompressible filler may be arranged inside of said metal tube.

According to at least one example embodiment, the second portion of the void is defined by internal segment wall portions defining said void, and an outer surface of said metal tube. Said second portion of the void does typically not correspond to any portion of the cavity of the metal based component, as it is not filled with an incompressible filler, and may thus be filled with material from one or more of said segments. That is, for example when the hot pressing process is carried out by placing said stack in a canister, and the subsequently subjecting said canister to said predetermined pressure and said predetermined temperature for said predetermined time, the segments will be compressed into the second portion of the void, up to the outer surface of the metal tube, which will withstand any further compression inwardly, as the incompressible filler is arranged inside of the metal tube, i.e. in the first portion of the void.

According to at least one example embodiment, said first portion of the void may be referred to as a first sub-void, and the second portion of the void may be referred to as a second sub-void. That is, according to such example embodiments, the method comprises the step of arranging a metal tube inside of said void such that said void is divided into at least two sub-voids, a first sub-void arranged inside of said metal tube, and a second sub-void arranged outside of said metal tube, wherein the first sub-void corresponds to previously defined first portion of the void, and is thus filled with an incompressible filler. Thus, the shape and dimensions of the first sub-void corresponds to, or are the same as, the shape and dimensions of the cavity of the metal based component.

According to at least one example alternative embodiment, the method comprises the step of arranging a hollow metal structure having a circumferentially surrounding metal wall, inside of said void such that said void is divided into at least two portions, said first portion inside of said hollow metal structure, and a second portion outside of said hollow metal structure.

Alternatively, as mentioned previously, the first portion of the void may be the only portion of the void, i.e. the shape and dimensions of the void corresponds to, or are the same as, the shape and dimensions of the cavity. Hence, no metal tube is arranged in said void. In other words, the shape of the complete, or whole, void corresponds to, or are the same as, the shape of the cavity of the metal based component, i.e. the size and dimensions of the void corresponds, or is equal to, the size and dimensions of the cavity of the metal based component.

According to at least one example embodiment, other per-machined inserts than a metal tube, such as e.g. a valve or a diode defining at least the first portion of the void, can be inserted into the void.

According to at least one example embodiment, the method further comprises the step of at least partly reusing the incompressible filler subsequent to said step of removing the incompressible filler from metal based component.

Hereby, the costs for manufacturing the metal based component having a cavity can be reduced, at the compressible filler may be used in the manufacturing of another metal based component.

According to at least one example embodiment, at least a part, such as e.g. the majority of, or all of, or substantially all of said incompressible filler is reused. According to at least one example embodiment, at least a part, such as e.g. the majority of, or all of, or substantially all of said diamond powder is reused.

According to at least one example embodiment, said step of arranging said plurality of segments in a stack comprising arranging said segments such that an opening to said void is formed in the envelope of said stack, and wherein said step of filling at least said portion, such as said first portion, of the void with an incompressible filler comprises introducing said incompressible filler to said portion, or said first portion, of the void via at least said opening, said method further comprising the steps of:
closing at least said portion of the void from the surroundings by closing at least a portion of said opening;
opening said cavity of the metal based component to the surroundings prior to removing said incompressible filler from said metal based component.

Hereby, said incompressible filler may easily and efficiently be supplied to at least said portion of the void, and said incompressible filler may easily and efficiently be held in at least said portion of the void during the hot pressing process, in which at least said portion of the void is forming said cavity, and may thus also easily and efficiently be removed from said cavity.

According to at least one example embodiment, said method comprises the step of closing said opening by a closing member, such as e.g. a lid. Said closing member may thus be sealingly connected to a portion of said stack. According to at least one example embodiment, said step of opening said cavity comprises removing, or penetrating, said closing member.

According to at least one example embodiment, more than one opening is provided in the envelope of said stack, such as e.g. a first opening and a second opening, said second opening being distant from said first opening. For such embodiments, all of the openings are closed prior to subjecting said stack to a hot pressing process.

According to at least one example embodiment, the method comprises the steps of:
making a 3D model of the desired metal based component;
discretizing the 3D model into model segments;

manufacturing the segments in said plurality of segments based on said model segments, wherein each one of the segments in said plurality of segments corresponds to a model segment.

Hereby, an efficient but yet simple way of manufacturing the segments used for manufacturing of the metal based component having a cavity is provided. The step of making a 3D model of the desired metal based component, and the step of discretizing the 3D model into model segments, are typically carried out using a computer or a computer means.

The step of manufacturing the segments may e.g. be carried out using water-jet cutting, laser cutting, milling, sawing or lazing.

According to at least one example embodiment, each one of the segments in the plurality of segments is metal based, e.g. made out of a wrought material, i.e. a metal of a high quality and a high strength, or made out of a cast material. For example, any one of the segments may comprise, or consist of, iron, steel, stainless steel, nickel, aluminum, copper, titanium, magnesium, bronze, stainless steel, super-duplex steel, precious metals e.g. gold or platinum, beryllium, zirconium, cobalt, nitinol, invar or magnesium combinations and/or alloys thereof. The segments may for example be made solely of metal, or be made from a mixture of metal and another type of material. According to at least one example embodiment of the invention, each one of the segments comprises mainly metal. For example, comprises at least 51%, or at least 80%, or at least 90%, or at least 95%, or at least 100% metal.

By the provision of having metal based segments, the segments will metallurgically bond to each other to form said metal based component during the step of subjecting said stack to a hot pressing process.

According to at least one example embodiment, the material of at least one of the segments is different from the material of at least another segment. Thus, at least one of said segments has different material properties as compared to another one of said segments. Moreover, said step of arranging said plurality of segments in a stack, may comprise arranging said at least one of said segments with a different material to a predetermined location of said stack.

Hereby, specific parts or portions of the metal based component, corresponding to the predetermined location of the at least one segment having different material properties, may be made of a material with different material properties as compared to other parts or portions of the metal based component. Thus, these specific part or portions of the metal based component may be made stronger by using a material with such material properties. Thus, a cost-effective method for strengthening these specific part or portions of the metal based component is provided.

The segment with different material properties as compared to another one of said plurality of segments, may e.g. be comprised of another material, such as another metal, as compared to another one of said plurality of segments.

According to at least one example embodiment, said method further comprises the step of:
treating at least some of the segments in said plurality of segments by surface treatment such as grinding, lapping, polishing, and/or cleaning, prior to the step of arranging said plurality of segments in a stack.

Thus, the segments in said stack may have been surface treated prior to be subjected to the hot pressing process step. The surface treatment may as stated be e.g. grinding, planar grinding, lapping, polishing, and/or cleaning. It should be noted that coating may according to at least one embodiment be considered to be comprised in general term of "surface treating". However, according to at least yet another embodiment, the coating may be considered to be the act of adding a layer to at least some of the segments, and hence not a treatment of the surface of segments per se. Hence, additionality or alternatively, the method comprises the step of coating at least one of the segments prior to the step of arranging said plurality of segments in said stack.

Grinding, lapping, polishing, cleaning and/or coating of at least some of the segments are done in order to ensure, or at least improve, metallurgical bonding during the hot pressing process step. During grinding, lapping, polishing, cleaning and/or coating step, dirt and/or oxides may be removed from the surface of at least some of the segments, and/or the properties of the at least one surface may be altered, of at least some of the segments. Hereby, direct contact between two facing surfaces of two neighboring segments may be improved.

According to at least one example embodiment, the choice between the techniques grinding, lapping, polishing, cleaning and/or coating is material dependent. In other words, depending on which metal that is used in the plurality of segments, different techniques or different combination of techniques may be used. For example, for a certain kind of metal, only cleaning may be needed or preferred, whereas for another kind of metal, cleaning, polishing and/or coating may be needed, or preferred, in order to ensure, or improve, metallurgical bonding during the hot pressing process step.

According to at least one example embodiment of the invention, when coating is performed, traces or residues of the coating may be visible in the final, or manufactured, metal based component, and therefore the coating may act as a finger print for the method when used.

The segments may e.g. be shaped as sheets or plates, such as e.g. bent sheets or bent plates, or have any other suitable form allowing the segments to be arranged in a stack. For example, the segments may be shaped as in at least one of the following: plates, sheets, foils, forged cubes, discs, or forged discs.

Such shapes of the segments are advantageous compared to e.g. metal powder, as metal powder provides a relatively low packing density, is associated with large shape-changes during the hot pressing process, and may be associated with harmful inhalation during handling of the metal powder. Moreover, plates, sheets, foils, cubes, and discs may be beneficial due to the related relatively high packing density, approximate between 95 and 100%.

According to at least one example embodiment, each one of the segments in the plurality segments, is larger than 5 mm in at least one extension, such as e.g. larger than 5 mm in diameter, or hydraulic diameter.

According to at least one example embodiment of the invention, the predetermined time and the predetermined temperature used during the hot pressing process are within the ranges of what is normally used within the hot pressing industry, e.g. within the HIPping industry. For example, the predetermined time may be within the range of 1 h to 12 h, the predetermined pressure may be within the range of 100 MPa to 200 MPa, and the predetermined temperature may be within the range of 500° C. to 1300° C. The predetermined time, the predetermined pressure and the predetermined temperature may all vary due to a variety of parameters known to the skilled person. For example, they may vary due to the size or the shape of the metal based component which is being manufactured. Further, they may vary due to the material choice, e.g. which metal is being used in the segments.

Thus, each one of the plurality of segments may bond metallurgically to at least another segment of said plurality of segments.

By using a hot pressing process, a strong metal based component with a high density and with relatively low residual stresses can be manufactured in an effective manner. Moreover, no, or very little subtractive removal of material is needed. Furthermore, by the manufacturing method of the metal based component according to the inventive concept, complex structures of the metal based component, as well as complex structure of the cavity in the metal based component, can be made more easily.

According to at least one example embodiment, the hot pressing process is a hot isostatic pressing process, also known as a HIPping process, which is particularly suitable for the manufacturing of the metal based component of the inventive concept. The HIPping process typically involves subjecting a component, in this case the stack, to both an elevated temperature and an isostatic gas pressure in a high pressure containment vessel, using for example argon as pressurizing gas.

By using HIPping for manufacturing the metal based component, the porosity in the structure of the metal based component can be further reduced and the density of the structure further increased. Thus, an advantage using HIPping is that the metal based component after the HIPping process step has a near-net shape, i.e. the shape of the manufactured metal based component after the HIPping process step is the same, or almost, or sufficiently the same as the desired shape of the final metal based component. Hence, post-treatment of the metal based component related to re-shaping can be omitted or at least reduced compared to prior art methods. If desired however, re-shaping, or other post-processing steps may be carried out to the metal based component. Moreover, and according to at least one example embodiment of the invention, during the HIPping process, portions or parts of the stack are subjected to some lateral shearing. The lateral shearing may act as a surface treatment and remove any residual oxidation layers, or dirt, on the segment, and thereby ensure a good metallurgical bonding.

According to at least one example embodiment, the hot pressing process involves subjecting the stack to a uniaxial pressure, e.g. by using a hot pressing equipment and the simultaneous application of heat and pressure, such as e.g. in a diffusing bonding furnace or a vacuum diffusion bonding furnace. Thus, the segments may bond metallurgically to each other at a temperature high enough to induce sintering and creep processes.

It should be noted that for e.g. HIPping, traditionally a can or canister, such as a HIPping can, or a HIPping canister, is filled with a metal powder, prior to subjecting the powder-filled can to the hot pressing. Thus, the metal based component is formed corresponding to what has been previously described, i.e. the metal powder is hot pressed for a predetermined time at a predetermined pressure and a predetermined temperature, and is thus consolidated to the metal based component. By using segments, the drawbacks of using metal powder as a starting material for the manufacturing method, such as e.g. low packing density and the resulting shape change of the final product, are overcome or at least reduced, as the packing density when using segments are superior to using metal powder. Hence, the method according to the invention may be described as a metal powder-free hot pressing (or HIPping) manufacturing method.

According to at least one example alternative embodiment, the hot pressing process is carried out without a can or canister. For such embodiments, the method comprises the step of perimetrically sealing at least a portion of said stack to seal said stack from the surroundings (possibly with the exception of a gas evacuating aperture, as explained below).

According to at least one example embodiment of the invention, said step of perimetrically sealing at least a portion of said stack is done by welding, vacuum brazing, metal brazing, MIG welding, TIG welding, electron beam welding and/or thermitic welding.

It should be understood that perimetrically sealing at least one portion of said stack for example means that an edge of one segment is sealed to an edge of another segment in said plurality of segments, or that an edge of one segment is sealed to a surface, such as e.g. a top surface portion or a bottom surface portion, of another segment of said plurality segments. Stated differently, each one of the segments comprises a top portion (such as e.g. a top surface portion), a bottom portion (such as e.g. a bottom surface portion) and at least one edge portion, which is a lateral portion extending between the top portion and the bottom portion (i.e. which corresponds to the thickness of the respective segment). According to one example embodiment, during the step of perimetrically sealing at least a portion of said stack, at least at portion of the edge portion of one segment is sealed to at least another edge portion or a top portion or a bottom portion of another segment of said plurality of segments.

According to at least one example embodiment, the perimetrical seal extends over the entire edge portion for at least one of the metal based sheets.

According to at least one example embodiment, said step of removing gas from said stack may comprises the sub-steps of:
 providing at least one gas evacuating aperture in stack, which gas evacuating aperture is fluidly connected to intermediate spaces between said segments;
 evacuating gas from said intermediate spaces via said at least one gas evacuating aperture.

Hereby, gas may be removed from said intermediate spaces in said stack in a relatively straightforward way. Thus, the intermediate spaces are in fluid communication with surfaces, such as internally arranged surfaces, of the segments. Hereby, gas, typically air, can be evacuated from the stack, thus providing a vacuum, or a partial vacuum, between the surfaces of different segments. Hereby, the metallurgically bonding of the segments is improved. Hence, for such embodiments, the gas is removed from the intermediate spaces to an outside of said stack by e.g. using a suction device connected to said at least one gas evacuating aperture.

According to at least one example embodiment of the invention, said at least one gas evacuating aperture is arranged in the envelope (i.e. the outer facing surfaces) of said stack.

According to at least one example embodiment of the invention, the shape of said at least one gas evacuating aperture is circular. Alternatively, the at least one gas escaping aperture may be elliptical or simply be described as having a round shape. The at least one gas evacuating may be described as a gas evacuating hole or as a gas evacuating opening. Yet alternatively, the gas escaping aperture may have the shape of a line, e.g. a groove or a slit, or it may have any regular or irregular form. According to one example embodiment, the gas evacuating aperture may have a predefined form.

According to at least one example embodiment, the gas evacuating aperture is provided to said first element or to said closing member (e.g. to said first or to said second closing member).

According to at least one example embodiment, the method comprises the steps of:
arranging a gas evacuating crimp tube to said stack, wherein an opening of said gas evacuating crimp tube covers said at least one gas evacuating aperture; and
sealing said gas evacuating crimp tube after the step of evacuating said gas from said intermediate spaces and prior to the step of subjecting said stack to a hot pressing process.

It should be understood that the term cover here means that the diameter of the opening of the crimp tube, i.e. the inner diameter of the crimp tube, is larger than the corresponding size of the at least one gas evacuating aperture. In other words, the opening of the crimp tube surrounds the at least one gas evacuating aperture.

Thus, gas may be removed from the intermediate spaces by evacuating gas from said intermediate spaces via said at least one gas evacuating aperture using said gas evacuating crimp tube. Moreover, the crimp tube may be used to test the degree of vacuum in the intermediate spaces, e.g. by connecting it to a vacuum pump.

According to at least one alternative example embodiment, said step of removing gas from said intermediate spaces comprises the sub-step of:
providing a chemical substance within at least one of the intermediate spaces, said chemical substance being configured to react with said gas in said intermediate spaces in order to remove said gas.

Hence, for such embodiments, the gas evacuating aperture can be omitted, as the gas within the intermediate spaces may react with said chemical substance in such a way that the gas is removed. It should be noted that the gas may thus be removed by a reaction with the chemical substance forming e.g. a solid material (i.e. not a gas), and/or be removed by absorption and trapping of the gas in the chemical substance.

The chemical substance may e.g. be held in at least one of the intermediate spaces, such as e.g. in a separate portion of one of the intermediate spaces, which separate portion later on can be removed (e.g. machined away) from the metal based component.

According to at least one example embodiment, said chemical substance is a Calcium based compound. For example, said chemical substance comprises at least one of the following substances: Ca, Ti, Zr, Ca—Mg, Ca—Al, Ca—Zn, Ca—Cu, any alloy of the same or any eutectic alloys.

According to at least one example embodiment, said chemical substance is molten, e.g. it may be comprised in a powder which subsequently melts during heating. According to at least one example embodiment, said chemical substance is configured to react with oxygen, nitrogen, hydrogen, water and/or a hydrocarbon.

According to at least one example embodiment, the method comprises the step of heating said chemical substance in order to make it react with said gas in the intermediate spaces. The amount of heating needed is dependent on the chosen chemical substance which is well known to the person skilled in the art.

According to at least one example embodiment, the step of heating said chemical substance is comprised in said step of subjecting said stack to a hot pressing process (e.g. the HIPping process step). Hence, according to such embodiments, the chemical substance will be heated during the initial time of the hot pressing process step.

Stated differently, and according to one example embodiment, the step of removing said gas from said intermediate spaces is a sub-step in said step of subjecting said stack to a hot pressing process.

Regardless of whether a canister is used, or if the stack is subject to said perimetrically sealing, the gas between the segments must typically be removed to provide a sufficient metallurgically bonding between the segments. According to at least one example embodiment, in said step of removing gas from said stack, at least 50%, or at least 60%, or at least 70%, or at least 80, or at least 90% of the gas is removed from said stack compared to prior to the step of removing gas from said stack. In other words, said step of removing gas from said stack, may comprise providing a vacuum, or a partial vacuum, in said stack. Stated differently, said step of removing gas from said stack, may comprise providing an under-pressure in said stack.

According to at least one example embodiment, said metal based component is a single unit metal based component.

The formed metal based component may e.g. have an extension in at least one direction of at least 0.05 m, such as e.g. at least 0.1 m. Additionality, or alternatively, the formed metal based component may have an extension in at least another direction of at least 0.5 m, such as e.g. at least 1 m, such as e.g. at least 2 m, such as e.g. at least 4 m.

According to at least one example embodiment, said method further comprises the step of reshaping, or reducing the size of, the metal based component by removing any undesired portions of the metal based component. Hence, the metal based component may be shaped and sized in a desired manner. Said removing may e.g. be performed by physically removing said portions, e.g. by cutting or machining away said portions. Said removing may alternatively be performed by chemical means, i.e. said portions may be removed chemically by e.g. subjecting (e.g. dipping) the metal based component to an acid etching away said portions.

According to second aspect of the present inventive concept, a metal based component having a cavity is provided. The metal based component comprises a body formed by a plurality of segments arranged in a stack, said body having an envelope comprising an opening fluidly connected to said cavity, and having internal wall portions defining said cavity, wherein said plurality of segments have metallurgically bonded to each other during hot pressing process for a predetermined time at a predetermined pressure and a predetermined temperature, wherein said metal based component comprises metallurgical detectable traces of said plurality of segments, wherein said metallurgical detectable traces are formed by crystallographic mismatch at interfaces between different segments in said plurality of segments.

Hereby, a strong metal based component with a high density and with relatively low residual stresses, having a cavity, can be provided, in which a hot pressing process, or a HIPping process, for a predetermined time at a predetermined pressure and a predetermined temperature, has been used to metallurgically bond the plurality of segments to form said metal based component.

According to at least one example embodiment, the metallurgical detectable traces are significant of the bonding of different segments of said plurality of segments during the hot pressing process (e.g. HIPping process), i.e. during the process of a hot pressing for a predetermined time at a predetermined pressure and a predetermined temperature.

For example, the former interface between two segments, each one of the segments being e.g. a sheet or a plate or a foil, may be traced as the trace appears as a straight line, along which line metal grains is arranged. Hence, the term trace may be interpreted as the traceable formation of residues or residuals of the former interfaces.

According to at least one example embodiment of the invention the traces mentioned above is made visible through etching of a cross-sectional sample of the metal based component.

According to at least one example embodiment, said metal based component having a cavity has been formed by arranging said plurality of segments in a stack in such a way that the shape of said stack corresponds to, or are the same as, the shape of the metal based component, and such that a void is formed in said stack, wherein the shape and dimensions of at least a portion of said void corresponds to, or are the same as, the shape and dimensions of said cavity, and wherein at least said portion of the void has been filled with an incompressible filler, and which incompressible filler subsequent to the hot pressing process step have been at least partly removed from said cavity.

Hereby, the cavity of the metal based component has been made in an efficient and effective manner, allowing for complex geometries, or a complex shape, of the cavity. According to at least one example embodiment, said opening is a first opening, and the envelope of said body comprises:
 a second opening fluidly connected to said cavity, and fluidly connected to said first opening, and wherein the cavity between said first and second openings is formed as a flow channel.

Thus, the metal based component may be a component for transferring a fluid in said flow channel.

According to at least one example embodiment, the cavity is to at least 70%, or to at least 80%, or to at least 90% covered or defined by said internal wall portions of the metal based component. Typically, the internal wall portions face inwards of metal based component.

According to at least one example embodiment, said flow channel comprises at least one bend, or at least two bends, or at least three bends.

Hereby, the cavity of said metal based component may have a continuous curvature, and possibly a relatively complex shape.

According to at least one example embodiment, the cavity comprises a portion with a relatively small cross sectional area, and a portion with a relatively large cross sectional area. According to at least one example embodiment, said portion with a relatively large cross sectional area is interposed between two portions having a relatively small cross sectional area. Such geometrical configurations are typically difficult to achieve with standard manufacturing technologies.

According to at least one example embodiment, a surface of said internal wall portions of the body comprises traces, or residues, of an incompressible filler.

According to at least one example embodiment, said incompressible filler comprising at least diamond powder. In other words, diamond powder particles, or traces of diamond powder particles, will be embedded in the surface of said internal wall portions. The effects, features and embodiments of the diamond powder are analogous to the diamond powder of the first aspect of the present invention and are not repeated again here. According to at least one example embodiment, said incompressible filler consists of diamond powder According to at least one example embodiment, said incompressible filler further comprises a solid insert, or a solid metal insert. The effects, features and embodiments of the solid insert, and the solid metal insert are analogous to the solid insert, and the solid metal insert of the first aspect of the present invention and are not repeated again here.

According to at least one example embodiment, said metal based component is a single unit metal based component.

According to at least one example embodiment, the metal based component of this second aspect may have been manufactured in a similar manner as the method according to the first aspect of the inventive concept.

According to at least one example embodiment, the metal based component according to the second aspect of the present inventive concept has been manufactured by the method according to the first aspect of the inventive concept.

Effects and features of this embodiment of the second aspect of the present inventive concept are thus largely analogous to those described above in connection with the first aspect of the inventive concept. Embodiments mentioned in relation to the first aspect of the present inventive concept are largely compatible with this embodiment of the second aspect of the inventive concept.

According to a third aspect of the present inventive concept, a metal based component is provided. The metal based component has been manufactured by the method according to the first aspect of the inventive concept.

Effects and features of this third aspect of the present inventive concept are thus largely analogous to those described above in connection with the first aspect of the inventive concept. Embodiments mentioned in relation to the first aspect of the present inventive concept are largely compatible with the third aspect of the inventive concept.

According to at least one example embodiment of the second or third aspect of the present inventive concept, said internal wall portions of said metal based component, or the inside or the internal surface of the metal tube or metal foil, is coated with a metal carbide layer, such as an Iron Carbide layer. Hence, the internal surface, or the internal wall portions, of said metal based component, which defines said cavity, is at least partly covered, or is coated, with a metal carbide layer. Such metal carbide layer is typically hard, and thus the internal wall portions of said cavity are more wear-resistant.

According to at least one example embodiment of the second or third aspect of the present inventive concept, the metal based component is a manifold, e.g. in which the cavity comprises a large pipe portion which is divided into a plurality of smaller pipe portions, or a reducer e.g. in which a relatively large portion of the cavity (i.e. having a relatively large cross sectional area) extends into a relatively small portion of the cavity (i.e. having a relatively small cross sectional area), or a fluid diode e.g. with a relatively complex geometry of the cavity. For example, the cavity may have a varying cross section alternating between relatively small cross sections and relatively larger cross sections. The metal based component may be a fluid transporting, or fluid holding, component in which the cavity is a flow channel for transporting fluid, or a reservoir for holding fluid, respectively. For example, the metal based component may be at least one of the following: a tube, a duct, a tee-pipe, a wy-pipe, a manifold, a U-bend, an elbow, a reducer, an expander, a nozzle, a branch, a reservoir, a spiral, a cruciform, a fluid diode, a valve.

According to a fourth aspect of the present inventive concept, use of an incompressible filler when manufacturing a metal based component having a cavity is provided. The incompressible filler is used in said cavity to maintain the desired shaped of said cavity during manufacturing of said metal based component by a hot pressing process. The metal based component has been manufactured by the method according to the first aspect of the inventive concept.

Effects and features of this fourth aspect of the present inventive concept are thus largely analogous to those described above in connection with the first aspect of the inventive concept. Embodiments mentioned in relation to the first aspect of the present inventive concept are largely compatible with the third aspect of the inventive concept. The metal based component may be the metal based component of said third aspect of the present inventive concept.

Thus, for example, said incompressible filler comprising, or consist of, diamond powder. In other words, use of diamond powder when manufacturing a metal based component having a cavity is provided. The effects, features and embodiments of the diamond powder are analogous to the diamond powder of the first aspect of the present invention and are not repeated again here.

For example, said incompressible filler further comprises a solid insert, or a solid metal insert. The effects, features and embodiments of the solid insert, and the solid metal insert are analogous to the solid insert, and the solid metal insert of the first aspect of the present invention and are not repeated again here.

BRIEF DESCRIPTION OF THE DRAWINGS

The above objects, as well as additional objects, features and advantages of the present inventive concept, will be more fully appreciated by reference to the following illustrative and non-limiting detailed description of embodiments of the present invention, when taken in conjunction with the accompanying drawings, wherein:

FIG. 1b shows an enlarged view of a side portion, or a top portion, of the stack of FIG. 1a;

FIG. 2a shows a schematic cross-sectional view of a metal based component and an incompressible filler, in accordance with at least one example embodiment of the invention;

FIG. 2b shows a cross-sectional view of at least some segments used to manufacture the metal based component of FIG. 2a;

FIG. 2c shows a perspective view of the segments of FIG. 2b;

DETAILED DESCRIPTION OF THE DRAWINGS

In the present detailed description, embodiments of the present invention will be discussed with reference to the accompanying figures. It should be noted that this by no means limits the scope of the invention, which is also applicable in other circumstances for instance with other types or variants of methods for manufacturing a metal based component having a cavity encompassed by the scope of the claims, then the embodiments shown in the appended drawings. Further, that specific features are mentioned in connection to an embodiment of the invention does not mean that those features cannot be used to an advantage together with other embodiments of the invention.

Figure 1A:
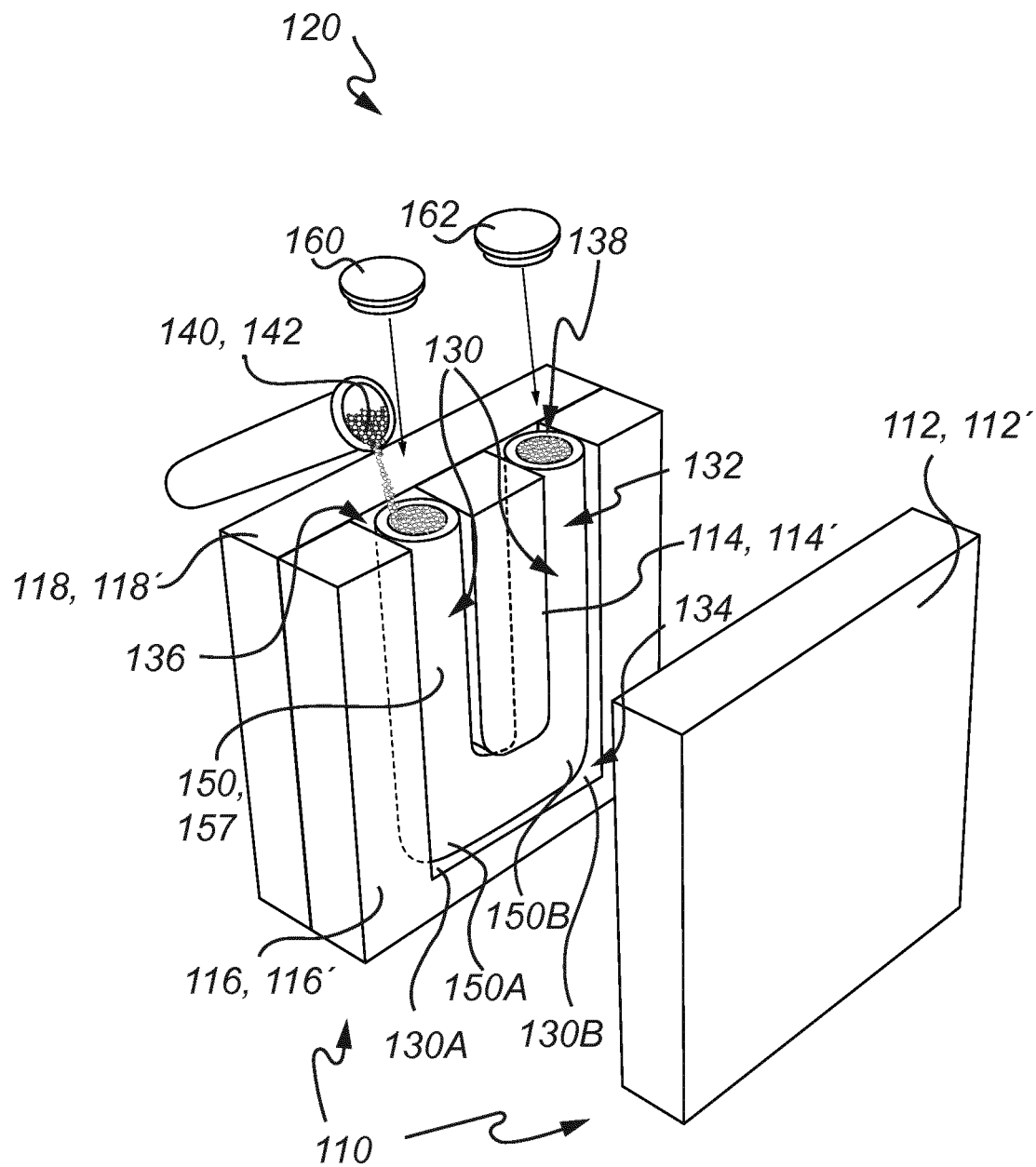
FIG. 1a shows an exploded perspective view of a stack in accordance with at least one example embodiment of the invention.

FIG. 1a shows an exploded perspective view of a stack 120 in accordance with at least one example embodiment of the invention. The stack 120 comprises a plurality of segments 110, in FIG. 1a being a first segment 112, a second segment 114, a third segment 116, and a fourth segment 118 (hereafter sometimes referred to the four segments 112, 114, 116, 118). The first segment 112 and the fourth segment 118 are end segments. For example, the first segment 112 may be a bottom segment 112 and the fourth segment may be a top segment 118. As seen in FIG. 1a, the plurality of segments 110 are arranged in the stack 120, such that the second segment 114 and the third segment 116 are arranged in between the first segment 112 and the fourth segment 118. The four segments 112, 114, 116, 118 of FIG. 1a are arranged such that a void 130 is formed in the stack 120. Each one of the four segments 112, 114, 116, 118 is typically metal based, and is e.g. made out of a wrought material. At least one of the four segments 112, 114, 116, 118 may be made out of a material which is different compared to at least another one of the segments 112, 114, 116, 118.

Figure 1B:
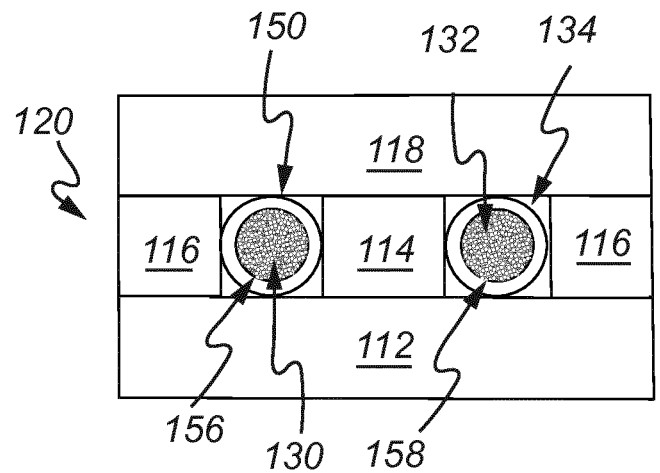

Moreover, in FIG. 1a the metal tube 150 is arranged inside of the void 130 such that the void 130 is divided into at least two portions 132, 134, or void portions 132, 134, or sub-voids 132, 134 (hereafter referred to as void portions 132, 134), better shown in FIG. 1b. A first void portion 132 is arranged inside of the metal tube 150, and a second void portion 134 is arranged outside of the metal tube 150. More specifically, the second void portion 134 is defined by internal segment wall portions (i.e. internal wall portions of the four segments 112, 114, 116, 118) defining the void 130, and an outer surface of the metal tube 150. Moreover, the first void portion 132 is defined by the internal volume of the metal tube 150.

The metal tube 150 of FIG. 1a, is shaped to have at least two bends 150A, 150B, forming a U-shape, and the two bends 150A, 150B are arranged in the void 130 at corresponding bends of the void 130A, 130B. However, the shape of the void 130 needs not to completely correspond to the shape of the metal tube 150, as long as the metal tube 150 can be arranged in the void 130. For example, the bends of the void 130A, 130B may not need to be rounded, but may be straight or square-shaped.

The four segments 112, 114, 116, 118 are arranged in the stack 120 such that a first opening 136 and a second opening 138 distant from the first opening 136, are provided in the envelope of the stack 120. Correspondingly, the metal tube 150 comprises a first tube opening 156, and a second tube opening 158 distant from the first tube opening 156. Thus, the void 130, and in particular the metal tube 150 is arranged as a flow channel 157, and is configured to enable a fluid to flow from the first tube opening 156 to the second tube opening 158.

As shown in FIG. 1a, a filler material 140, and more specifically an incompressible filler 140, is provided, and may be inserted into the first void portion 132 via the first opening 136 and more specifically, via the first tube opening 156 to fill the first void portion 132. The second tube opening 158 may also be used to fill the first void portion 132 with the incompressible filler 140. That is, in FIG. 1a, the incompressible filler 140 is inserted into the metal tube 150 arranged in the void 130. The incompressible filler 140 in FIG. 1a is a powder 142, and more specifically a diamond powder 142. The diamond powder may e.g. have an average powder size of between 1 micron and 1000 microns, preferably between 50 microns and 500 microns.

Prior to subjecting the stack to a hot pressing process, as is described further below, the first opening 136 and the second opening 138, or at least the first tube opening 156 and the second tube opening 158 are closed from the surroundings by a first closing member 160 and second closing member 162, respectively.

Figure 1C:
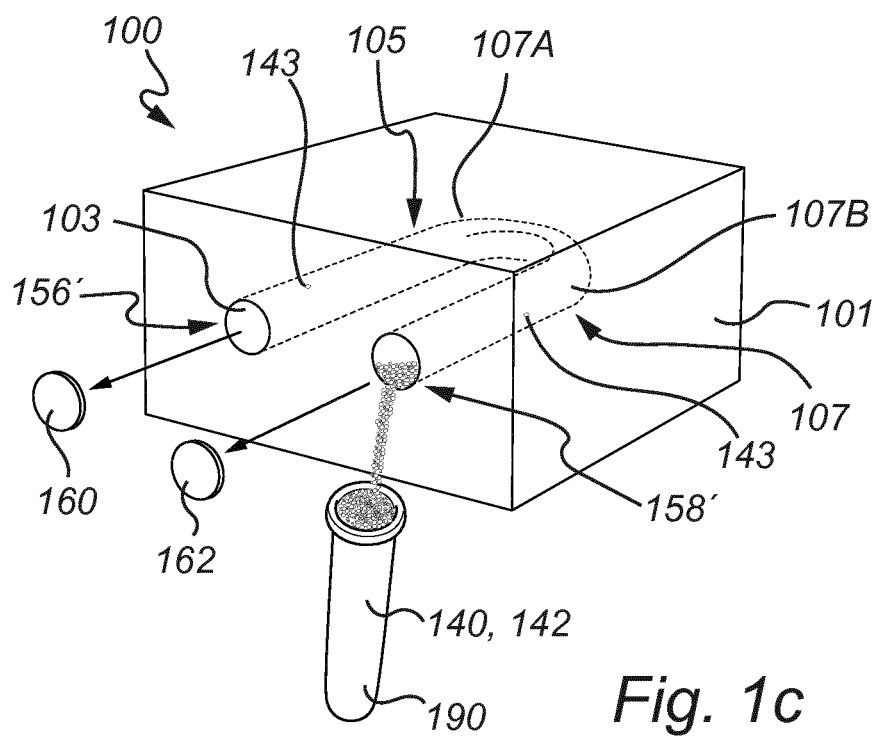
FIG. 1c shows a metal based component form by said stack of FIG. 1a and FIG. 1b.

FIG. 1c shows a metal based component 100 having a body 101 and a cavity 103 formed in the body 101. The body 101 of the metal based component 100 has been formed by the stack 120 of FIG. 1a and FIG. 1b, during a hot pressing process for a predetermined time at a predetermined pressure and a predetermined temperature wherein the four segments 112, 114, 116, 118 and the metal tube 150 have metallurgically bonded to each other. Stated differently, the plurality of segments 110 of FIG. 1a and FIG. 1b are arranged in the stack 120 such that the stack 120 corresponds to the body 101 of the metal based component 100, or such that the shape of the stack 120 is the same as the shape of the body 101 of the metal based component 100. Thus, the plurality of segments 110 corresponds to, or are shaped equally to, different portions of the body 101 of the metal based component 100.

As seen in FIG. 1c, the body 101 comprises a first body opening 156' arranged in the envelope of the body 101, the first body opening 156' corresponding to the first tube opening 156, and comprises a second body opening 158' arranged in the envelope of the body 101, the second body opening 158' corresponding to the second tube opening 158. The first body opening 156' and the second body opening 158' are in fluid contact with the cavity 103, and the cavity 103 may thus be referred to as a flow channel 107 configured to enable a fluid to flow from the first body opening 156' to the second body opening 158'.

During the hot pressing process, the shape and dimensions of the first void portion 132, which is filled with the incompressible filler 140, 142, will be maintained. Hereby, the first void portion 132 holding the incompressible filler 140, 142 will form the cavity 103 of the metal based component 100 in a desired manner. That is, the shape and dimensions of the cavity 103 will be the same, or substantially the same as, (i.e. will correspond to) the shape and dimensions of the first void portion 132. Hence, the flow channel 107 will in a corresponding manner comprise at least two bends 107A, 107B.

The second void portion 134 on the other hand, which is not filled with an incompressible filler 140, 142, will instead be filled with material from one or more of the four segments 112, 114, 116, 118. That is, for example, when the hot pressing process is carried out by placing the stack 120 of FIG. 1a and FIG. 1b in a canister, and the subsequently subjecting the canister to the predetermined pressure and the predetermined temperature for the predetermined time, at least one of the plurality of segments 110 will be compressed into the second void portion 134, up to the outer surface of the metal tube 150, which metal tube 150 will withstand any further compression inwardly, as the incompressible filler 140, 142 is arranged inside of the metal tube 150, i.e. in the first void portion 132. Hereby, an efficient method for manufacturing a metal based component 100 having a cavity 103 is provided.

After the hot pressing process, the incompressible filler 140, 142 is at least partly removed from the cavity 103, which is enabled by that the first and second closing members 160, 162 are removed from the first and second body openings 156', 158', respectively. As indicated by the gathering of the diamond powder 142 in a tube 190, the diamond powder 142 may be collected and possibly be reused.

The cavity 103 is defined at least partly by internal wall portions 105, and is, in FIG. 1c, defined at least partly by the first and second body openings 156', 158'. As a trace or as a residue, a surface of the internal wall portions 105 of the body 101 comprises diamond powder particles 143 which is embedded in the surface of the internal wall portions 105.

According to at least one example embodiment, the internal wall portions 105 are coated with a metal carbide layer, such as an Iron Carbide layer. Such metal carbide layer may e.g. origin from a reaction between diamond powder particles and internal segment wall portions, or an internal surface of the metal tube 105.

Figure 2D:
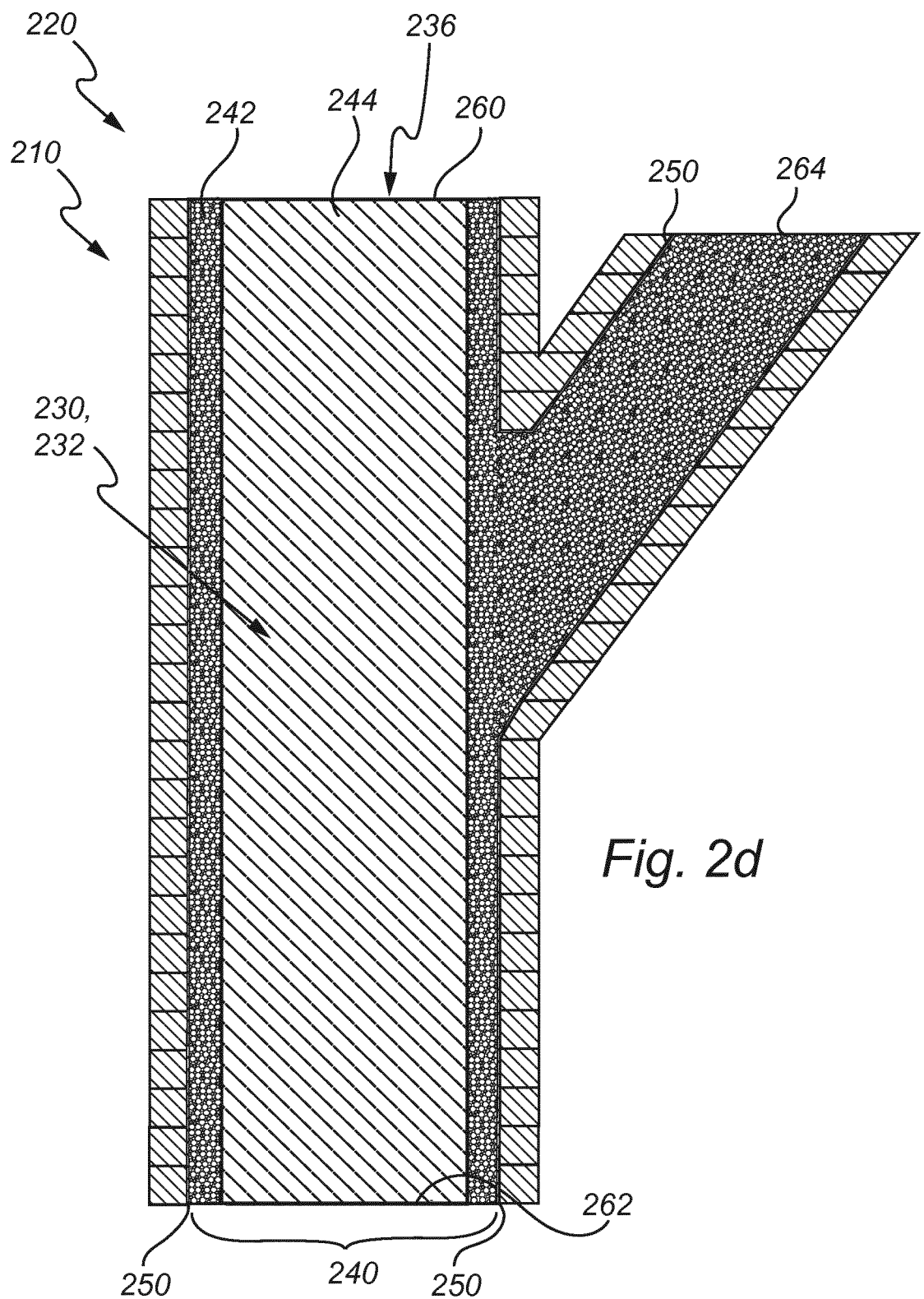
FIG. 2d shows a cress-sectional view of a stack used to manufacture the metal based component of FIG. 2a, in accordance with at least one example embodiment of the invention.

Turning to FIG. 2a showing a cross section of a metal based component 200 comprising a body 201 and a cavity 203 formed in the body 201. The metal based component 200 has been manufactured in a similar manner as the metal based component 100 of FIG. 1c. Thus, in short, and with reference to FIG. 2d, the body 201 of the metal based component 200 has been manufactured by a plurality of segments 210 arranged in a stack 220, wherein the plurality of segments 210 have metallurgically bonded to each other during a hot pressing process for a predetermined time at a predetermined pressure and a predetermined temperature.

In FIG. 2b and FIG. 2c, only a sub-set 210' of the plurality of segments 210 of FIG. 2d is shown, and more specifically, three segments 212, 214, 216, wherein each one of the three segments 212, 214, 216 comprises a through hole 212A, 214A, 216A. The three segments 212, 214, 216 are arranged in such a way that a stack 220' is formed, and such that the through holes 212A, 214A, 216A align. The aligned through holes 212A, 214A, 216A thus form at least a part of a void 230 (of which only a part of the void 230 is shown in FIG. 2b and FIG. 2c, complete void is shown in FIG. 2d, but in FIG. 2d). As mentioned above, FIG. 2b and FIG. 2c only discloses a sub-set 210' of the plurality of segments 210 used for manufacturing the metal based component 200 of FIG. 2a, thus more segments than the three segments 212, 214, 216 with a respective through hole are typically used for manufacturing the metal based component 200 of FIG. 2a, however the stacking principle, and the alignment of the through holes for forming the void 230, are equivalent to the shown three segments 212, 214, 216 of FIG. 2b, and FIG. 2c. Such configuration of a stack 210 is shown in FIG. 2d.

In FIG. 2d, the void 230 is not divided in the same way as the void 130 of FIG. 1a, and the void 230 consists of the portion 232 of the void housing the incompressible filler 240. In other words, the above referred to first void portion corresponds to the only portion 232 of the void 230, or alternatively described, a first part 232 of the void 230, or a first void part 232 is the only part of the void 230. As also shown in FIG. 2d a filler material 240, and more specifically an incompressible filler 240, is arranged in the void 230 to fill the void 230. The incompressible filler 240 in FIG. 2d comprises a powder 242, such as a diamond powder 242 as described with reference to FIG. 1a, and a solid insert 244, such as a solid metal insert 244, The diamond powder may e.g. have an average powder size of between 1 micron and 1000 microns, preferably between 50 microns and 500 microns. As shown in FIG. 2d, the solid metal insert 244 is embedded in the diamond powder 242, such that the solid metal insert 244 is prevented from being in contact with any one of the plurality of segments 210. Hereby bonding between any one of the plurality of segments 210 and the solid metal insert 244 during the hot pressing process is prevented. Moreover, as shown in FIG. 2d, a metal foil 250 is arranged inside of the void 230 between the plurality of segments 210 and the incompressible filler 240. Thus, contact between the plurality of segments 210 and the incompressible filler 240 is prevented. In more detail, the metal foil 250 is arranged between the diamond powder 242 and internal segment wall portions. Thus, the diamond powder 242 is prevented from undesirably entering any gaps or spaces within the stack 220.

During the hot pressing process, similar to that described with reference to FIGS. 1a-1c, the shape and dimensions of the void 230, which is filled with the incompressible filler 240, 242, 244 will be maintained. Hereby, the void 230 holding the incompressible filler 240, 242, 244 will form the cavity 203 of the metal based component 200 in a desired manner. That is, the shape and dimensions of the cavity 203 will be the same, or substantially the same as, (i.e. will correspond to) the shape and dimensions of the void 230. Correspondingly, the body 201 of the metal based component 200 has been formed by the stack 220 of FIG. 2d, during the hot pressing process for a predetermined time at a predetermined pressure and a predetermined temperature wherein the plurality of segments 210 has metallurgically bonded to each other. Hence, each one of the plurality of segments 210 is typically metal based, and is e.g. made out of a wrought material. Stated differently, the plurality of segments 210 of FIG. 2d and are arranged in the stack 220 such that the stack 220, or the shape of the stack 220, corresponds to the body 201 of the metal based component 200, or the shape of the body 201 of the metal based component 200. Thus, the plurality of segments 210 corresponds to different portions of the body 201 of the metal based component 200.

Turning back to FIG. 2a, the metal based component 200 comprises a first elongated portion 200A, and a second elongated portion 200B, wherein the second elongated portion 200B is branched with an angle to the first elongated portion 200A thus forming the metal based component in a y-shape having at least one bend 207A. The body 201 is in common for the first elongated portion 200A and the second elongated portion 200B. Furthermore, as the body 201 comprises the cavity 203, also the cavity will be y-shaped corresponding to the shaped of the first elongated portion 200A and the second elongated portion 200B. Moreover, a first body opening 256, a second body opening 258, and a third body opening 259 are formed in the envelope of the body 201. All of the body openings 256, 258, 259 corresponds to respective openings in the stack 220, and have been closed by a first, second and third closing arrangement 260, 262, 264 respectively during the hot pressing process.

As shown in FIG. 2a, the second closing arrangement 262 has been removed, and thus the cavity 203 is opened to the surroundings, and the compressible filler 240 is, i.e. the diamond powder 242 and the solid metal insert 244 are, being removed from the cavity 203 via the second body opening 258. When the incompressible filler 240 has been removed, all of the first, second and third body openings 256, 258, 259 will be in fluid contact with each other, and the cavity 203, thus forming a flow channel 207 which is y-shaped within the body 201.

The cavity 203 is defined at least partly by internal wall portions 205, and is, in FIG. 2a, defined at least partly by the first, second and third body openings 256, 258, 259. The internal wall portions 205 defining the cavity will stem from the metal foil 250, as the metal foil 250 has been metallurgically bonded to the plurality of segments 210 during the hot pressing process. As a trace or as a residue, a surface of the internal wall portions 205 of the body 201 comprises diamond powder particles 243 which is embedded in the surface of the internal wall portions 205.

According to at least one example embodiment, the internal wall portions 205 are coated with a metal carbide layer, such as an Iron Carbide layer. Such metal carbide layer may e.g. origin from a reaction between diamond powder particles and internal segment wall portions, or a surface of the metal foil 250.

Figure 3:
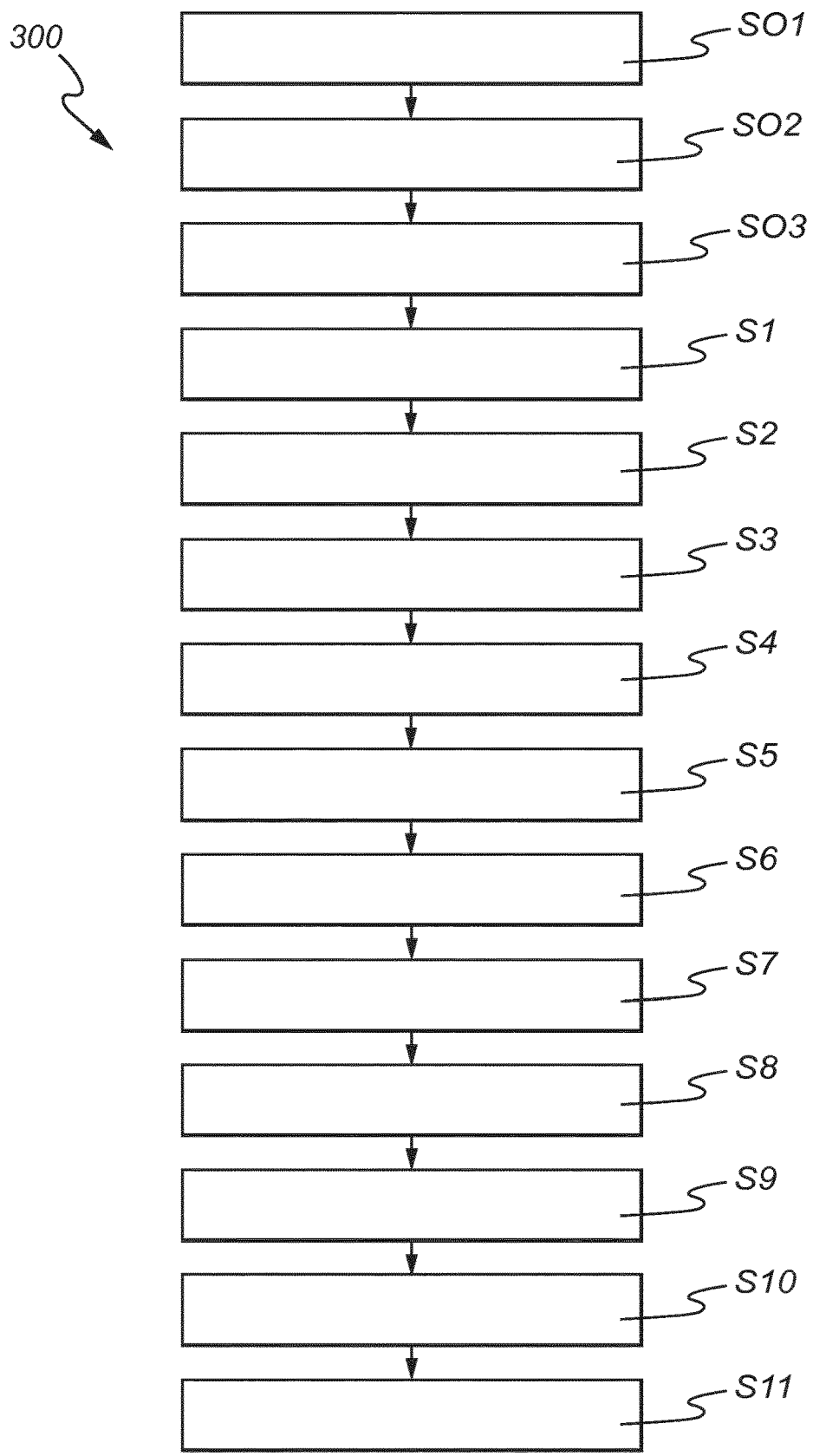
FIG. 3 shows a flow-chart explaining the steps of a method in accordance with at least one embodiment of the invention.

Turning to FIG. 3 showing a flow chart of the steps in a method 300 for manufacturing a metal based component 100, 200 having a cavity 103, 203, according to at least one embodiment of the inventive concept. The metal based components 100, 200 of FIG. 1c and FIG. 2a are examples of the result of the method described in relation to FIG. 3. Thus reference numerals used to describe structures and features in FIGS. 1a-1c and FIGS. 2a-2d will used when describing the method 300 of FIG. 3.

The method 300 comprises the steps of (steps are abbreviated with the capital "S"):

S1: providing a plurality of segments 110, 210 corresponding to different portions of the metal based component 100, 200;

S2: arranging the plurality of segments 110, 210 in a stack 120, 220 in such a way that the shape of the stack 120, 220 corresponds to, or are the same as, the shape of the metal based component 100, 200, and such that a void 130, 230 is formed in the stack 120 220, wherein a the shape of at least a portion 132, 232 of the void 130, 230 corresponds to, or are the same as, the shape of the cavity 103, 203;

S3: arranging a metal foil 250 inside of the void 230 such that the metal foil 250 prevents contact between the segments 210 and the incompressible filler 240.

S4: arranging a metal tube 150 inside of the void 130 such that the void 130 is divided into at least two portions 132, 134, a first portion 132 inside of the metal tube 150, and a second portion 134 outside of the metal tube 150. The first portion 132 being the portion of the void 130 which shape corresponds to, or are the same as, the shape of the cavity 103.

It should be noted that steps S3 and S4 are optional. However, the void 130, 230 may be a single void 230 of the stack 220, or the void 130 may be divided into at least two portions 132, 134 or parts 132, 134.

S5: filling the first portion 132 of the void 130, or filling the void 230 (i.e. at least the portion 132, 232 of the void 130, 230 which shape corresponds to, or are the same as, the shape of the cavity 103, 203) with an incompressible filler 140, 240;

In step S5, for embodiments in which the incompressible filler 140, 240 comprises a diamond powder 142, 242 and a solid metal insert 244, the step S5 comprises embedding the solid metal insert 244 in the diamond powder 242.

It should be noted that the step S2 of arranging the plurality of segments 110, 210 in a stack 120, 220 may comprise arranging the segments 110, 210 such that an opening 136, 236 to the void 130, 230 is formed in the envelope of the stack 110, 210, and that the step S5 of filling at least the first portion 132 of the void 130, or filling the void 230, with an incompressible filler 140, 240 comprises introducing the incompressible filler 140, 240 to the first portion 132 of the void 130, or the void 230, via at least the opening 136, 236. The method may further comprise the step of S6: closing at least the first portion 132 of the void 130, or closing the void 230, from the surroundings by closing at least a portion of the opening 136, 236.

S7: removing gas from the stack 120, 220;

S8: subjecting the stack 120, 220 to a hot pressing process for a predetermined time at a predetermined pressure and a predetermined temperature such that the segments 110, 210 bond metallurgically to each other to form the metal based component 100, 200 comprising the cavity 103, 203;

S9: opening the cavity 103, 203 of the metal based component 100, 200 to the surroundings.

S10: removing at least a part of the incompressible filler 140, 240 from the metal based component 100, 200.

In step S10, for embodiments in which the incompressible filler comprises diamond powder 142, 242, the step S10 comprises removing at least a part of the diamond powder 142, 242 from the metal based component 100, 200.

S11: at least partly reusing the incompressible filler 140, 240 subsequent to the step S10 of removing the incompressible filler 140, 240 from metal based component 100, 200.

The method 300 may further comprise the following three steps prior to the step S1 of providing a plurality of segments 110, 210:

S01: making a 3D model of the desired metal based component 100, 200;

S02: discretizing the 3D model into model segments 112', 114', 116', 118'; 212', 214', 216', the model segments 112', 114', 116', 118'; 212', 214', 216' are indicated in FIG. 1a and FIG. 2b;

S03: manufacturing the segments 112, 114, 116, 118; 212, 214, 216 in the plurality of segments 110, 210 based on the model segments 112', 114', 116', 118'; 212', 214', 216', wherein each one of the segments 112, 114, 116, 118; 212, 214, 216 in the plurality of segments 110, 210 corresponds to a model segment 112', 114', 116', 118'; 212', 214', 216'.

Figure 4:
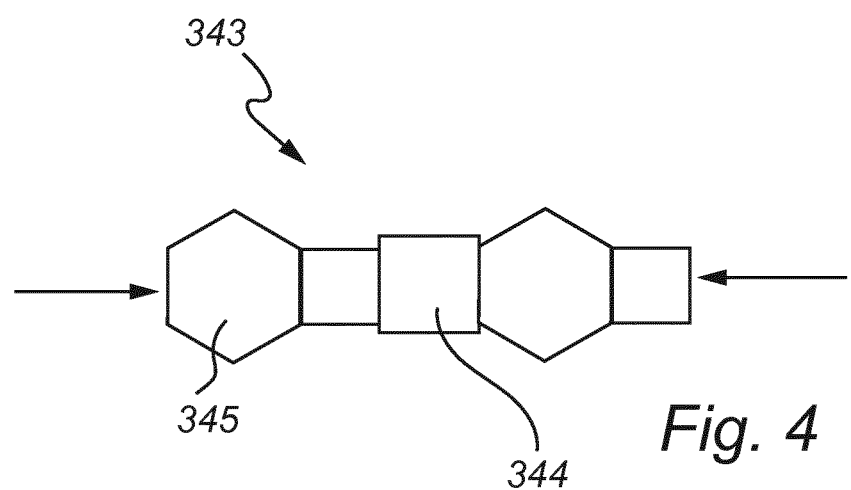
FIG. 4 shows a schematic, top view of at least some diamond powder particles used in accordance with at least one example embodiment of the invention.

Turning to FIG. 4 showing a schematic, top view of at least some diamond powder particles 343 of the diamond powder 142, 242, as the diamond powder 142, 242 is arranged in the first portion 132 of the void 130 (i.e. the first void portion 132) or in the void 230. As seen in FIG. 4, the diamond powder particles 343 are formed in well-defined shapes as squares 344 and hexagons 345 with crystal facets having straight edges. The crystal facets of different diamond powder particles 343 are in contact with each other, and thus withstand compression when being subject to an external load (indicated by arrows in FIG. 4), such as an external load stemming from the hot pressing process and the predetermined pressure.

Figure 5:
FIG. 5 shows a micrograph of a trace in a metal based component in accordance with at least one example embodiment of the invention.

FIG. 5 shows a micrograph of a trace 1100, e.g. a metallurgical detectable trace, of the interface between two different segments in the plurality of segments 110, 210, which trace is visible in the metal based component 100, 200 after it is manufactured by the hot pressing process. In the micrograph, the line 1102, along which line a crystallographic mismatch of metal grains 1106 is clearly visible.

Thus, the traces are formed by crystallographic mismatch at interfaces between different segments in the plurality of segments 110, 210.

FIGS. 6a, 6b, 6c and 6d show different embodiments of metal based components 400, 500, 600, 700 formed in accordance with the method of the invention (as e.g. method 300 of FIG. 3) by a hot pressing process of stack (not shown) with a principle structure as the stacks 120, 220 in FIGS. 1a-1b and FIG. 2d but where the arrangement of the plurality of segments 110, 210 have been arranged and stacked to correspond to the shape of the present metal based components 400, 500, 600, 700. Thus, an incompressible filler has been used in the formation of each one of the metal based components 400, 500, 600, 700 to form a respective cavity 403, 503, 603, 703 from a void, or a first void portion. Thus each one of the metal based components 400, 500, 600, 700 of FIGS. 6a, 6b, 6c and 6d, comprise a body 401, 501, 601, 701 formed by a plurality of segments arranged in a stack, wherein the plurality of segments have metallurgically bonded to each other during a hot pressing process (e.g. a HIPping process) for a predetermined time at a predetermined pressure and a predetermined temperature.

Figure 6A:
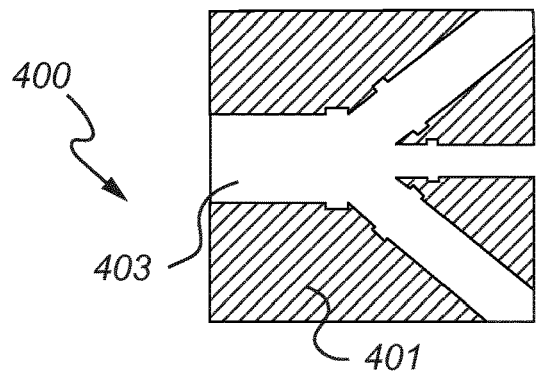
FIGS. 6a, 6b, 6c and 6d show different embodiments of metal based components having a cavity in accordance with at least some example embodiments of the invention.
Figure 6B:
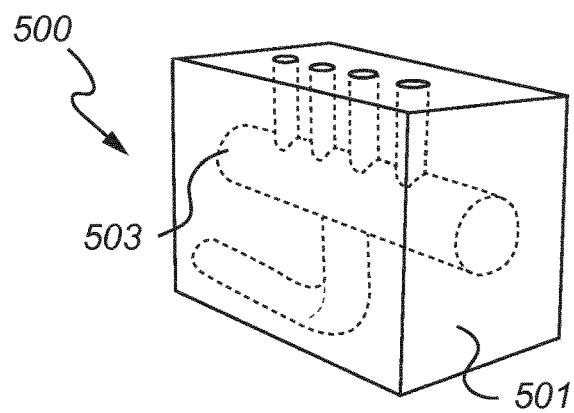
Figure 6C:
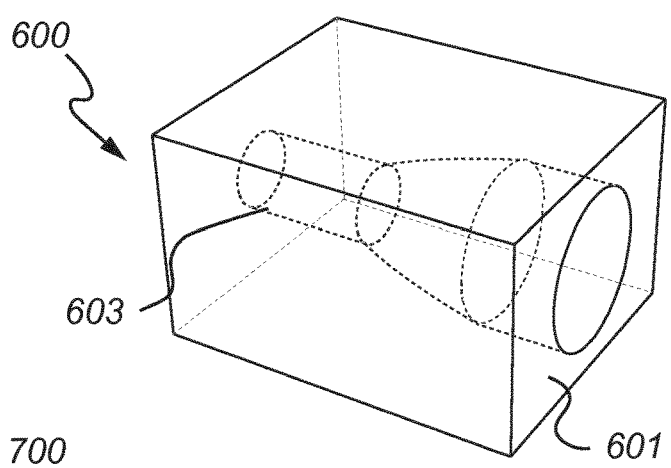
Figure 6D:
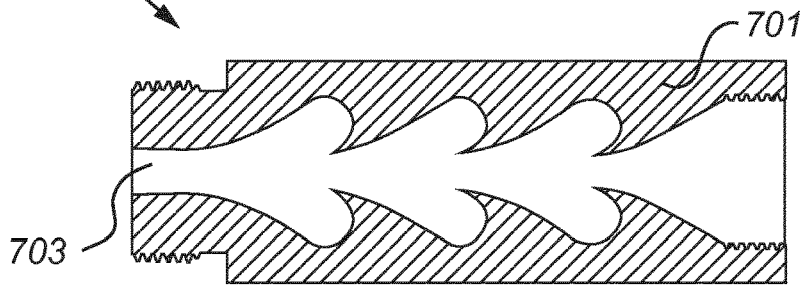

In FIG. 6a the metal based component 400 is a manifold in which the cavity 403 comprises a large pipe portion which is divided into three smaller pipe portions. In FIG. 6b, the metal based component 500 is another manifold in which the cavity 503 comprises a relatively large pipe which ends into a common pipe from which four relatively small pipes extends. In FIG. 6c, the metal based component 600 is a reducer in which a relatively large portion of the cavity 603 (i.e. having a relatively large cross sectional area) extends into a relatively small portion of the cavity 603 (i.e. having a relatively small cross sectional area). In FIG. 6d, the metal based component 700 is a fluid diode with a relatively complex geometry of the cavity 703. For the fluid diode, the cavity has a varying cross section alternating between relatively small cross sections and relatively larger cross sections.

The person skilled in the art realizes that the present invention by no means is limited to the embodiments described above. The features of the described embodiments may be combined in different ways, and many modifications and variations are possible within the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

ITEMIZED LIST OF EMBODIMENTS

1. A method for manufacturing a metal based component (100, 200) having a cavity (103, 203), said method comprising the steps of:
providing a plurality of segments (110, 210) corresponding to different portions of the metal based component;
arranging said plurality of segments in a stack (120, 220) in such a way that the shape of said stack corresponds to the shape of the metal based component, and such that a void (130, 230) is formed in said stack, wherein the shape of at least a portion of said void corresponds to the shape of said cavity;
filling at least said portion of the void with an incompressible filler (140, 240);
removing gas from said stack;

subjecting said stack to a hot pressing process for a predetermined time at a predetermined pressure and a predetermined temperature such that said segments bond metallurgically to each other to form said metal based component comprising said cavity;

removing at least a part of said incompressible filler from said metal based component.

2. The method according to item 1, wherein said incompressible filler comprising at least diamond powder (142, 242), and wherein said step of removing at least a part of said incompressible filler comprises removing at least a part of said diamond powder from said metal based component.

3. The method according to item 2, wherein an average powder size of said diamond powder is between 1 micron and 1000 microns, preferably between 50 microns and 500 microns.

4. The method according to any one items 2-3, wherein said incompressible filler further comprises a solid metal insert (244), and wherein said step of filling at least said portion of the void with an incompressible filler comprises embedding said solid metal insert in said diamond powder.

5. The method according to any one of the preceding items, comprising the step of arranging a metal foil (250) inside of said void such that said metal foil prevents contact between said segments and said incompressible filler.

6. The method according to any one of the preceding items, said portion of the void is a first portion (132) of the void, and the method comprises the step of arranging a metal tube (150) inside of said void such that said void is divided into at least two portions (132, 134), said first portion (132) inside of said metal tube, and a second portion (134) outside of said metal tube, and wherein the material of said metal tube is the same or different compared to the material of at least one of the segments.

7. The method according to any one of the preceding items, further comprising the step of at least partly reusing the incompressible filler subsequent to said step of removing the incompressible filler from metal based component.

8. The method according to any one of the preceding items, wherein said step of arranging said plurality of segments in a stack comprising arranging said segments such that an opening (136, 236) to said void is formed in the envelope of said stack, and wherein said step of filling at least said portion of the void with an incompressible filler comprises introducing said incompressible filler to said portion of the void via at least said opening, said method further comprising the steps of:
   closing at least said portion of the void from the surroundings by closing at least a portion (156, 236) of said opening;
   opening said cavity of the metal based component to the surroundings prior to removing said incompressible filler from said metal based component.

9. The method according to any one of the preceding items, further comprising the steps of:
   making a 3D model of the desired metal based component;
   discretizing the 3D model into model segments (112', 114', 116', 118'; 212', 214', 216');
   manufacturing the segments (112, 114, 116, 118; 212, 214, 216) in said plurality of segments based on said model segments, wherein each one of the segments in said plurality of segments corresponds to a model segment.

10. The method according to any one of the preceding items, each one of the segments in the plurality of segments is metal based, e.g. made out of a wrought material, and wherein the material of at least one of the segments is different from the material of at least another segment.

11. A metal based component (100, 200, 300, 400, 500, 600) having a cavity (103, 203, 303, 403, 503, 603), said metal based component comprising a body (101, 201, 301, 401, 501, 601) formed by a plurality of segments (110, 210) arranged in a stack (120, 220), said body having an envelope comprising an opening (156', 256) fluidly connected to said cavity, and having internal wall portions (105, 205) defining said cavity, wherein said plurality of segments have metallurgically bonded to each other during a hot pressing process for a predetermined time at a predetermined pressure and a predetermined temperature, wherein said metal based component comprises metallurgical detectable traces (1100) of said plurality of segments, wherein said metallurgical detectable traces are formed by crystallographic mismatch at interfaces (1102) between different segments in said plurality of segments.

12. A metal based component according to item 11, wherein said opening is a first opening, and the envelope of said body comprises:
   a second opening (158', 258) fluidly connected to said cavity, and fluidly connected to said first opening, and wherein the cavity between said first and second openings is formed as a flow channel (107, 207).

13. A metal based component according to item 11, wherein said flow channel comprises at least one bend (107A, 107B, 207A).

14. The metal based component according to any one of items 11-13, wherein said metal based component has been manufactured by the method according to any one of items 1-10.

15. The metal based component according to any one of items 11-14, wherein a surface of said internal wall portions of the body comprises traces, or residues (143, 243), of an incompressible filler.

16. Use of an incompressible filler when manufacturing a metal based component having a cavity, wherein said incompressible filler is used in said cavity to maintain the desired shaped of said cavity during manufacturing of said metal based component by a hot pressing process.

17. Use of an incompressible filler in which said incompressible filler comprises diamond powder wherein the powder size of said diamond powder is between 1 micron and 1000 microns, preferably between 50 microns and 500 microns.

The invention claimed is:

1. A metal based component having a cavity, said metal based component comprising a body formed by a plurality of segments arranged in a stack, said body having an envelope comprising an opening fluidly connected to said cavity, and having internal wall portions defining said cavity, wherein said plurality of segments have metallurgically bonded to each other during a hot pressing process for a predetermined time at a predetermined pressure and a predetermined temperature, wherein said metal based component comprises metallurgical detectable traces of said plurality of segments, wherein said metallurgical detectable traces are formed by crystallographic mismatch at interfaces between different segments in said plurality of segments, wherein a surface of said internal wall portions of the body comprises diamond powder particles or traces of diamond powder particles embedded in said surface.

2. A metal based component according to claim 1, wherein said opening is a first opening, and the envelope of said body comprises:

a second opening fluidly connected to said cavity, and fluidly connected to said first opening, and wherein the cavity between said first and second openings is formed as a flow channel.

3. A metal based component according to claim 1, wherein said flow channel comprises at least one bend.

4. The metal based component according to claim 1, wherein said metal based component has been manufactured by a method comprising the steps of:

providing the plurality of segments corresponding to different portions of the metal based component;

arranging said plurality of segments in the stack in such a way that the shape of said stack corresponds to the shape of the metal based component, and such that a void is formed in said stack, wherein the shape of at least a portion of said void corresponds to the shape of said cavity, under conditions at which the segments in the stack do not form any metallurgical bonds with each other;

filling at least said portion of the void with an incompressible filler;

removing gas from said stack;

subjecting said stack to the hot pressing process for the determined time at the predetermined pressure and the predetermined temperature such that said segments bond metallurgically to each other to form said metal based component comprising said cavity; and removing at least a part of said incompressible filler from said metal based component.

5. A metal based component according to claim 1, wherein the surface of said internal wall portions of the body comprises the diamond powder particles embedded in said surface.

6. A metal based component according to claim 5, wherein an average particle size of the diamond powder particles is between 1 micron and 1000 microns.

7. A metal based component according to claim 6, wherein an average particle size of the diamond powder particles is between 50 microns and 500 microns.

8. A metal based component according to claim 5, wherein the diamond powder particles embedded in the surface of said internal wall portions of the body provide said surface with an increased wear-resistance.

9. A metal based component according to claim 8, wherein an average particle size of the diamond powder particles is between 1 micron and 1000 microns.

10. A metal based component according to claim 9, wherein an average particle size of the diamond powder particles is between 50 microns and 500 microns.

11. A metal based component according to claim 1, wherein the surface of said internal wall portions of the body comprises the traces of diamond powder particles embedded in said surface.

12. A metal based component according to claim 11, wherein the traces of diamond powder particles embedded in the surface of said internal wall portions of the body provide said surface with an increased wear-resistance.

* * * * *